United States Patent
Raghavan et al.

(10) Patent No.: US 11,622,288 B2
(45) Date of Patent: Apr. 4, 2023

(54) INDICATING BLOCKAGE EVENTS AS A CAUSE FOR CHANGES IN RANK INFORMATION OR CHANNEL QUALITY INFORMATION

(71) Applicant: QUALCOMM Incorporated, San Diego, CA (US)

(72) Inventors: Vasanthan Raghavan, West Windsor Township, NJ (US); Iyab Issam Sakhnini, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/303,618

(22) Filed: Jun. 3, 2021

(65) Prior Publication Data

US 2022/0394506 A1    Dec. 8, 2022

(51) Int. Cl.
*H04W 24/02* (2009.01)
*H04B 7/06* (2006.01)
*H04B 7/10* (2017.01)

(52) U.S. Cl.
CPC .......... *H04W 24/02* (2013.01); *H04B 7/0632* (2013.01); *H04B 7/10* (2013.01)

(58) Field of Classification Search
CPC ........ H04W 24/02; H04B 7/10; H04B 7/0632
See application file for complete search history.

(56) References Cited

U.S. PATENT DOCUMENTS

| | | | | |
|---|---|---|---|---|
| 4,335,446 A * | 6/1982 | Gandini | .................. | H04L 27/00 375/342 |
| 10,123,322 B1 * | 11/2018 | Nam | ................. | H04W 72/1294 |
| 11,134,473 B2 * | 9/2021 | Raghavan | ............. | H04L 5/0032 |
| 11,190,953 B2 * | 11/2021 | He | ....................... | H04B 7/0695 |
| 11,463,151 B2 * | 10/2022 | Bengtsson | ............... | H04B 7/10 |
| 2007/0099578 A1 * | 5/2007 | Adeney | .................... | H04B 7/10 455/25 |
| 2011/0105045 A1 * | 5/2011 | Tanaka | ................ | H04W 72/046 455/67.11 |

(Continued)

FOREIGN PATENT DOCUMENTS

| | | |
|---|---|---|
| WO | 2020025099 | 2/2020 |
| WO | 2020164636 A1 | 8/2020 |
| WO | 2021008495 A1 | 1/2021 |

OTHER PUBLICATIONS

International Search Report and Written Opinion—PCT/US2022/071858—ISA/EPO—dated Aug. 1, 2022.

*Primary Examiner* — James M Perez
(74) *Attorney, Agent, or Firm* — Harrity & Harrity, LLP

(57) ABSTRACT

Various aspects of the present disclosure generally relate to wireless communication. In some aspects, a user equipment (UE) may transmit, to a base station, an indication that indicates a blockage event as a cause for a change in one or more of rank information or channel quality information, wherein the blockage event is associated with a differential signal power between a first polarization and a second polarization. The UE may receive, from the base station, a transmission based at least in part on the indication that indicates the blockage event as the cause for the change in one or more of the rank information or the channel quality information. Numerous other aspects are described.

30 Claims, 8 Drawing Sheets

500 →

510 — Transmit, to a base station, an indication that indicates a blockage event as a cause for a change in one or more of rank information or channel quality information, wherein the blockage event is associated with a differential signal power between a first polarization and a second polarization 520 — Receive, from the base station, a transmission based at least in part on the indication that indicates the blockage event as the cause for the change in one or more of the rank information or the channel quality information

(56) References Cited

U.S. PATENT DOCUMENTS

| | | | |
|---|---|---|---|
| 2013/0115886 A1* | 5/2013 | Khan | H01Q 21/061 455/39 |
| 2013/0331039 A1* | 12/2013 | Hillstrom | H04B 7/10 455/39 |
| 2014/0133589 A1* | 5/2014 | Ouchi | H04B 7/0689 375/295 |
| 2015/0093107 A1* | 4/2015 | Jovicic | H04B 10/116 398/25 |
| 2015/0230263 A1* | 8/2015 | Roy | H04B 7/0695 455/452.2 |
| 2015/0381282 A1* | 12/2015 | Zhang | H04W 72/0453 370/330 |
| 2017/0244451 A1* | 8/2017 | Raghavan | H04L 7/04 |
| 2018/0054832 A1* | 2/2018 | Luo | H04B 7/022 |
| 2018/0145742 A1* | 5/2018 | Li | H04B 7/0871 |
| 2018/0184387 A1* | 6/2018 | Axén | H04W 52/40 |
| 2018/0184441 A1* | 6/2018 | Faxér | H04L 5/0048 |
| 2018/0192306 A1* | 7/2018 | Wang | H04W 52/225 |
| 2018/0199258 A1* | 7/2018 | Cezanne | H04W 40/06 |
| 2018/0235013 A1* | 8/2018 | Jung | H04W 74/006 |
| 2018/0249526 A1* | 8/2018 | Nagaraja | H04W 24/08 |
| 2018/0263025 A1* | 9/2018 | Kim | H04W 72/1273 |
| 2018/0269947 A1* | 9/2018 | Levitsky | H04B 7/0695 |
| 2018/0278318 A1* | 9/2018 | Chakraborty | H04W 52/146 |
| 2018/0278320 A1* | 9/2018 | Chendamarai Kannan | H04B 7/0811 |
| 2018/0332625 A1* | 11/2018 | Tsai | H04B 7/0408 |
| 2019/0037423 A1* | 1/2019 | Yu | H04B 7/06 |
| 2019/0141744 A1* | 5/2019 | Naghshvar | H04B 7/0452 |
| 2019/0150003 A1* | 5/2019 | He | H04B 7/0617 342/368 |
| 2019/0158319 A1* | 5/2019 | Cezanne | H04L 1/0003 |
| 2019/0190747 A1* | 6/2019 | Park | H04W 52/24 |
| 2019/0222279 A1* | 7/2019 | Xi | H04B 7/0408 |
| 2019/0373559 A1* | 12/2019 | Davydov | H04W 52/146 |
| 2020/0145070 A1* | 5/2020 | Raghavan | H04B 7/0874 |
| 2020/0280128 A1* | 9/2020 | Rafique | H01Q 3/267 |
| 2021/0068077 A1* | 3/2021 | Raghavan | H04W 72/02 |
| 2021/0175937 A1* | 6/2021 | Yamada | H04W 16/28 |
| 2021/0175957 A1* | 6/2021 | Raghavan | H04B 7/0452 |
| 2021/0184755 A1* | 6/2021 | Bengtsson | H04B 17/382 |
| 2021/0194545 A1* | 6/2021 | Venugopal | H04W 72/046 |
| 2021/0194658 A1* | 6/2021 | Venugopal | H04B 17/336 |
| 2021/0204346 A1* | 7/2021 | Ye | H04B 7/00 |
| 2021/0234593 A1* | 7/2021 | Raghavan | H04B 7/0874 |
| 2021/0234604 A1* | 7/2021 | Raghavan | H04L 27/2675 |
| 2021/0328639 A1* | 10/2021 | Karakkad Kesavan Namboodiri | H04B 7/0695 |
| 2021/0344558 A1* | 11/2021 | Lee | H04B 7/0408 |
| 2022/0109490 A1* | 4/2022 | Ma | H04B 7/0695 |
| 2022/0209832 A1* | 6/2022 | Raghavan | H04B 7/0486 |
| 2022/0294519 A1* | 9/2022 | Ling | H04B 7/0695 |

* cited by examiner

INDICATING BLOCKAGE EVENTS AS A CAUSE FOR CHANGES IN RANK INFORMATION OR CHANNEL QUALITY INFORMATION

FIELD OF THE DISCLOSURE

Aspects of the present disclosure generally relate to wireless communication and to techniques and apparatuses for indicating blockage events as a cause for changes in rank information or channel quality information.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, an apparatus for wireless communication at a user equipment (UE) includes a memory and one or more processors, coupled to the memory, configured to: transmit, to a base station, an indication that indicates a blockage event as a cause for a change in one or more of rank information or channel quality information, wherein the blockage event is associated with a differential signal power between a first polarization and a second polarization; and receive, from the base station, a transmission based at least in part on the indication that indicates the blockage event as the cause for the change in one or more of the rank information or the channel quality information.

In some aspects, an apparatus for wireless communication at a base station includes a memory and one or more processors, coupled to the memory, configured to: receive, from a UE, an indication that indicates a blockage event as a cause for a change in one or more of rank information or channel quality information, wherein the blockage event is associated with a differential signal power between a first polarization and a second polarization; and perform a transmission, to the UE, based at least in part on the indication that indicates the blockage event as the cause for the change in one or more of the rank information or the channel quality information.

In some aspects, a method of wireless communication performed by a UE includes transmitting, to a base station, an indication that indicates a blockage event as a cause for a change in one or more of rank information or channel quality information, wherein the blockage event is associated with a differential signal power between a first polarization and a second polarization; and receiving, from the base station, a transmission based at least in part on the indication that indicates the blockage event as the cause for the change in one or more of the rank information or the channel quality information.

In some aspects, a method of wireless communication performed by a base station includes receiving, from a UE, an indication that indicates a blockage event as a cause for a change in one or more of rank information or channel quality information, wherein the blockage event is associated with a differential signal power between a first polarization and a second polarization; and performing a transmission, to the UE, based at least in part on the indication that indicates the blockage event as the cause for the change in one or more of the rank information or the channel quality information.

In some aspects, a non-transitory computer-readable medium storing a set of instructions for wireless communication includes one or more instructions that, when executed by one or more processors of a UE, cause the UE to: transmit, to a base station, an indication that indicates a blockage event as a cause for a change in one or more of rank information or channel quality information, wherein the blockage event is associated with a differential signal power between a first polarization and a second polarization; and receive, from the base station, a transmission based at least in part on the indication that indicates the blockage event as the cause for the change in one or more of the rank information or the channel quality information.

In some aspects, a non-transitory computer-readable medium storing a set of instructions for wireless communication includes one or more instructions that, when executed by one or more processors of a base station, cause the base station to: receive, from a UE, an indication that indicates a blockage event as a cause for a change in one or more of rank information or channel quality information, wherein the blockage event is associated with a differential signal power between a first polarization and a second polarization; and perform a transmission, to the UE, based at least in part on the indication that indicates the blockage event as the cause for the change in one or more of the rank information or the channel quality information.

In some aspects, an apparatus for wireless communication includes means for transmitting, to a base station, an indication that indicates a blockage event as a cause for a change in one or more of rank information or channel quality information, wherein the blockage event is associated with a differential signal power between a first polarization and a second polarization; and means for receiving, from the base station, a transmission based at least in part on the indication that indicates the blockage event as the cause for the change in one or more of the rank information or the channel quality information.

In some aspects, an apparatus for wireless communication includes means for receiving, from a UE, an indication that indicates a blockage event as a cause for a change in one or more of rank information or channel quality information, wherein the blockage event is associated with a differential signal power between a first polarization and a second polarization; and means for performing a transmission, to the UE, based at least in part on the indication that indicates the blockage event as the cause for the change in one or more of the rank information or the channel quality information.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
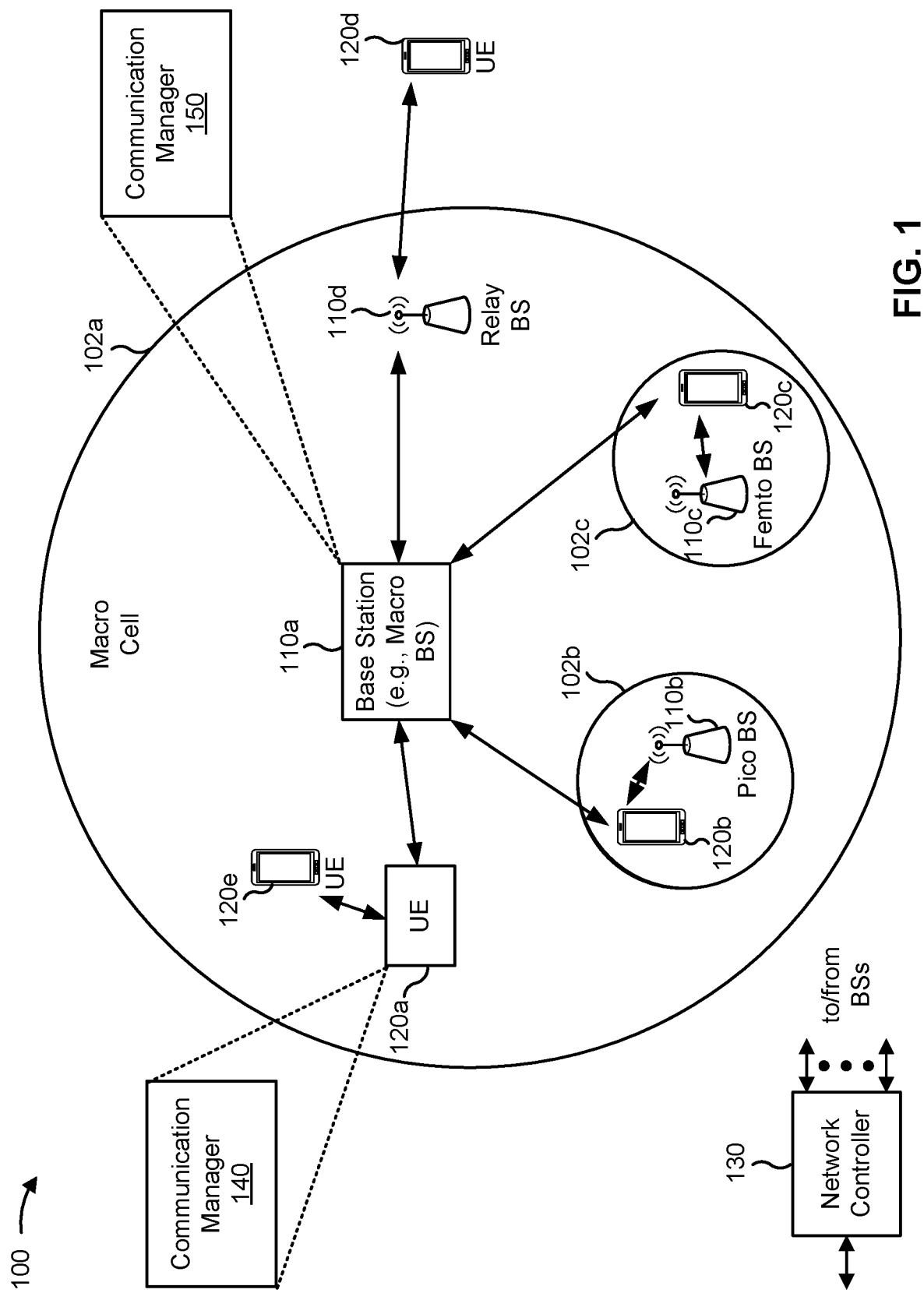
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, a UE (e.g., UE 120) may include a communication manager 140. As described in more detail elsewhere herein, the communication manager 140 may transmit, to a base station, an indication that indicates a blockage event as a cause for a change in one or more of rank information or channel quality information, wherein the blockage event is associated with a differential signal power between a first polarization and a second polarization; and receive, from the base station, a transmission based at least in part on the indication that indicates the blockage event as the cause for the change in one or more of the rank information or the channel quality information. Additionally, or alternatively, the communication manager 140 may perform one or more other operations described herein.

In some aspects, a base station (e.g., base station 110) may include a communication manager 150. As described in more detail elsewhere herein, the communication manager 150 may receive, from a UE, an indication that indicates a blockage event as a cause for a change in one or more of rank information or channel quality information, wherein the blockage event is associated with a differential signal power between a first polarization and a second polarization; and perform a transmission, to the UE, based at least in part on the indication that indicates the blockage event as the cause for the change in one or more of the rank information or the channel quality information. Additionally, or alternatively, the communication manager 150 may perform one or more other operations described herein.

As indicated above, FIG. 1 is provided as an example. Other examples may differ from what is described with regard to FIG. 1.

Figure 2:
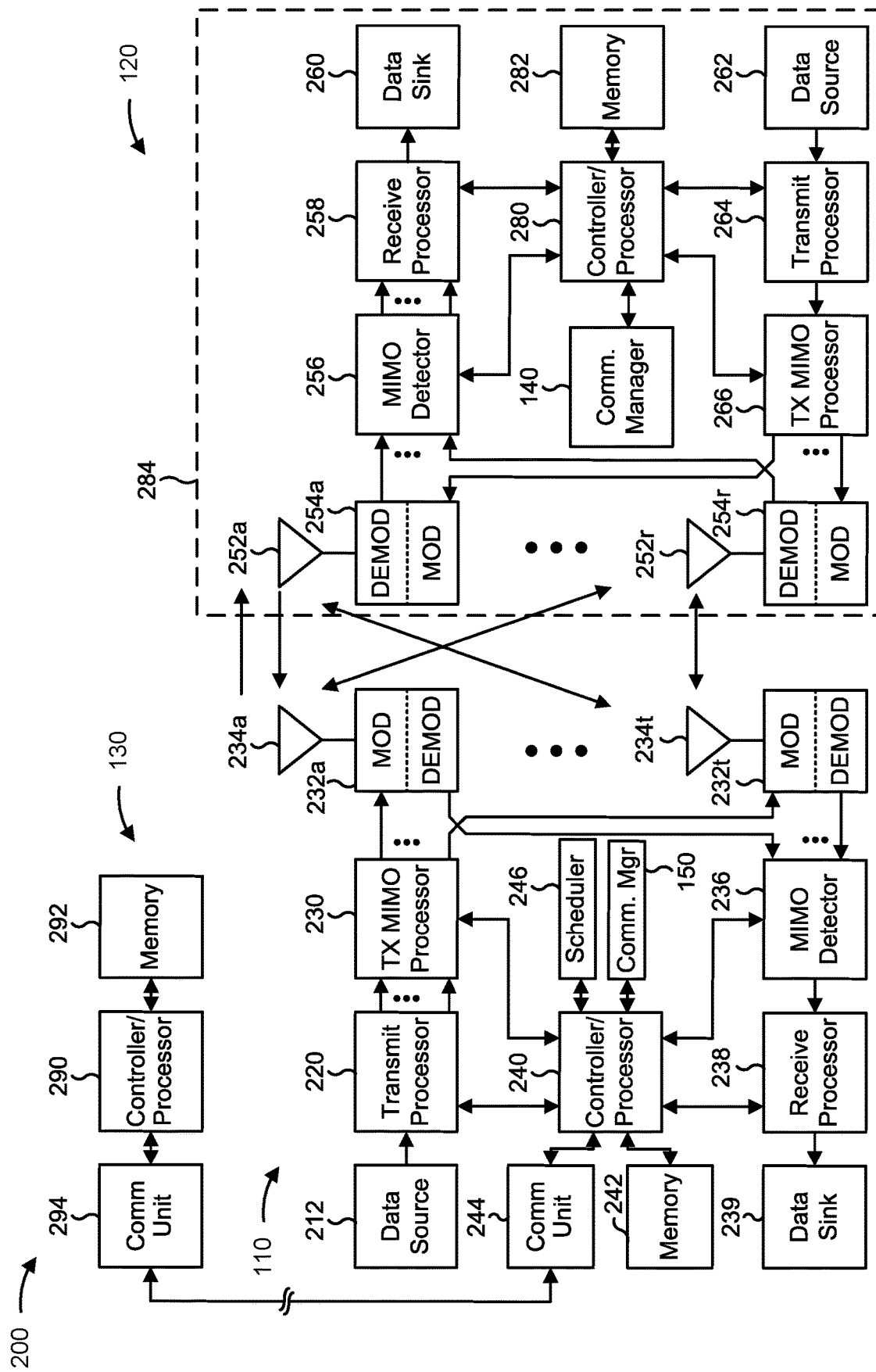
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIG. 4).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIG. 4).

Controller/processor 240 of base station 110, controller/processor 280 of UE 120, and/or any other component(s) of FIG. 2 may perform one or more techniques associated with indicating blockage events as a cause for changes in rank information or channel quality information, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some aspects, executing instructions may include running the instructions, converting the instructions, compiling the instructions, and/or interpreting the instructions, among other examples.

In some aspects, a UE (e.g., UE 120) includes means for transmitting, to a base station, an indication that indicates a blockage event as a cause for a change in one or more of rank information or channel quality information, wherein the blockage event is associated with a differential signal power between a first polarization and a second polarization; and/or means for receiving, from the base station, a transmission based at least in part on the indication that indicates the blockage event as the cause for the change in one or more of the rank information or the channel quality information. The means for the UE to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, a base station (e.g., base station 110) includes means for receiving, from a UE, an indication that indicates a blockage event as a cause for a change in one or more of rank information or channel quality information, wherein the blockage event is associated with a differential signal power between a first polarization and a second polarization; and/or means for performing a transmission, to the UE, based at least in part on the indication that indicates the blockage event as the cause for the change in one or more of the rank information or the channel quality information. The means for the base station to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Millimeter wave systems may involve using multiple antennas at a base station and multiple antennas at a UE. Millimeter wave systems may provide dual polarization beamforming, in which two layers may be associated with a beam that is pointed in a specific direction. The two layers may correspond to a co-polarization and a cross polarization, respectively. Dual polarization may provide an orthogonality, which may increase a data rate. The beam may be steered in the specific direction over the dual polarizations. The dual polarization beamforming from multiple antennas may improve a link performance. The dual polarization beamforming may be a codebook-based and/or directional beamforming, which may be assumed at both the base station and the UE.

A fixed codebook may be stored in a memory of both the base station and the UE due to memory and/or complexity constraints. Beam training may be performed over this fixed codebook. The beam training may involve a first phase (P1), a second phase (P2), and a third phase (P3). The first phase may be associated with a beam selection over wider beamwidths at both ends. The second phase may be associated with a beam refinement for a transmitter, such as the base station. The third phase may be associated with a beam refinement for a receiver, such as the UE. Beam training based at least in part on the fixed codebook may involve a static codebook approach.

Hand blockage may be a problem at millimeter wave frequencies. Hand blockage may involve a user's hand being inadvertently or deliberately placed over an antenna module (or antenna panel) of the UE. The user's hand may be placed on the antenna module and/or an RF circuit associated with the antenna module. During the hand blockage, indentations on the user's hand may distort signals that are being received at the antenna module or transmitted from the antenna module. The indentations associated with the user's hand may have a similar distance profile as a carrier wavelength, thereby causing disruption to the signals in the millimeter wave frequencies. The disruption to the signals may include a signal distortion and/or a signal degradation.

Figure 3:
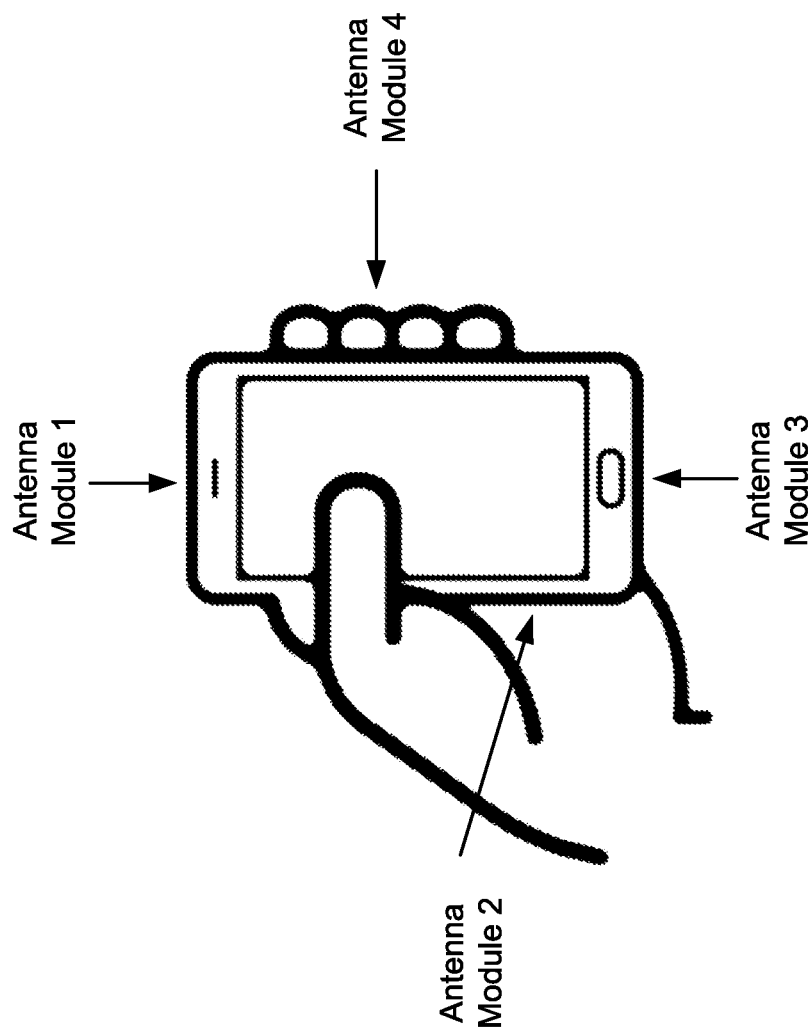
FIG. 3 is a diagram illustrating an example of a hand blockage of one or more antenna elements of an antenna module of the UE, in accordance with the present disclosure.

FIG. 3 is a diagram illustrating an example 300 of a hand blockage of one or more antenna elements of an antenna module of the UE, in accordance with the present disclosure.

As shown in FIG. 3, the UE may have a plurality of antenna modules, such as a first antenna module at a top portion/short edge of the UE, a second antenna module at a left side/long edge of the UE, a third antenna module at a bottom portion/short edge of the UE, and a fourth antenna module at a right side of the UE. The UE may include the plurality of antenna modules at different locations to improve coverage, antenna diversity, spherical coverage, and/or cost. The antenna modules may also be referred to as antenna panels or antenna subarrays. A user's hand may block one or more antenna elements of an antenna module of the UE, which may cause signal disruption. For example, the user's hand may distort a signal or block the signal from reaching the one or more antenna modules. In some cases, a hand blockage involving one or two fingers that block one or more antenna elements of an antenna module may lead to a signal loss of approximately 2-40 dB. In other words, a loss of approximately 2-40 dB may result on the antenna elements that are subjected to hand blockage.

As indicated above, FIG. 3 is provided as an example. Other examples may differ from what is described with regard to FIG. 3.

In millimeter wave systems, dual polarization beamforming may involve two layers. A first layer may be associated with a co-polarization, and a second layer may be associated with a cross polarization. Hand blockage may cause signal disruption associated with the co-polarization and/or the cross polarization. As a result, a UE capable of dual polarization beamforming may effectively operate with a single layer, which may reduce a data rate associated with the UE. In other words, based at least in part on the hand blockage, the UE may effectively switch from a two-layer performance to a one-layer performance. The hand blockage may be more significant at certain angles and/or certain frequencies, so an effect of the hand blockage may depend on a specific direction and/or frequency at which a beam is steered over the dual polarizations. The UE may suffer from signal distortion across polarizations when associated with the specific direction and/or frequency.

At the UE, the dual polarization may be a linear polarization, which may be a horizontal polarization or a vertical polarization, or a slant 45 degree polarization and slant −45 degree polarization (as characteristic examples of linear polarization). Hand blockage may lead to different losses between the horizontal and vertical polarizations. For example, the horizontal polarization may be subjected to less loss as compared to the vertical polarization. Alternatively, the horizontal polarization may be subjected to more loss as compared to the vertical polarization. Losses on the horizontal polarization versus the vertical polarization (e.g., which polarization suffers more losses in relation to the other polarization) may be based at least in part on various factors, including an interaction of hand dielectric properties, a nature of UE substrate layers and materials of the UE (e.g., a ground plane on a user's hand), an impact of other circuits in the UE (e.g., cameras, and/or sensors) on the user's hand, antenna element properties and/or antenna module placement and/or mounting, and/or an angle and frequency of interest. Differential losses between the horizontal and vertical polarizations due to hand blockage may result in an RSRP drop and/or performance drop in one layer relative to another layer, since the horizontal polarization may be associated with one layer and the vertical polarization may be associated with the other layer. The RSRP and/or performance drop in one layer relative to another layer may result in a rank drop and a reduction in data rate.

Similarly, hand blockage may lead to a differential performance between slant polarizations (e.g., 45 degrees and −45 degrees polarizations), circular polarizations, and/or elliptical polarizations (e.g., left hand or right hand circular/elliptical polarizations).

In various aspects of techniques and apparatuses described herein, a UE configured for dual polarization beamforming may determine a differential signal power between a first polarization and a second polarization based at least in part on a difference between a first signal power associated with the first polarization and a second signal power associated with the second polarization. The UE may determine that a blockage event (e.g., a hand blockage event) is a cause for a change in rank information and/or channel quality information based at least in part on the differential signal power between the first polarization and the second polarization satisfying a threshold. When the threshold is satisfied, the first polarization or the second polarization may be degraded. The UE may transmit, to a base station, an indication that indicates the blockage event as the cause for the change in rank information and/or channel quality information. The blockage event may be associated with the differential signal power between the first polarization and the second polarization satisfying the threshold. The UE may receive, from the base station, a transmission based at least in part on the indication that indicates the blockage event. For example, the first polarization and the second polarization may be associated with a first type of polarization, and the transmission received from the base station may be associated with a second type of polarization. In other words, the base station may switch from the first type of polarization to the second type of polarization when performing the transmission, which may allow the UE to receive the transmission on two layers even though the first polarization or the second polarization is degraded.

Figure 4:
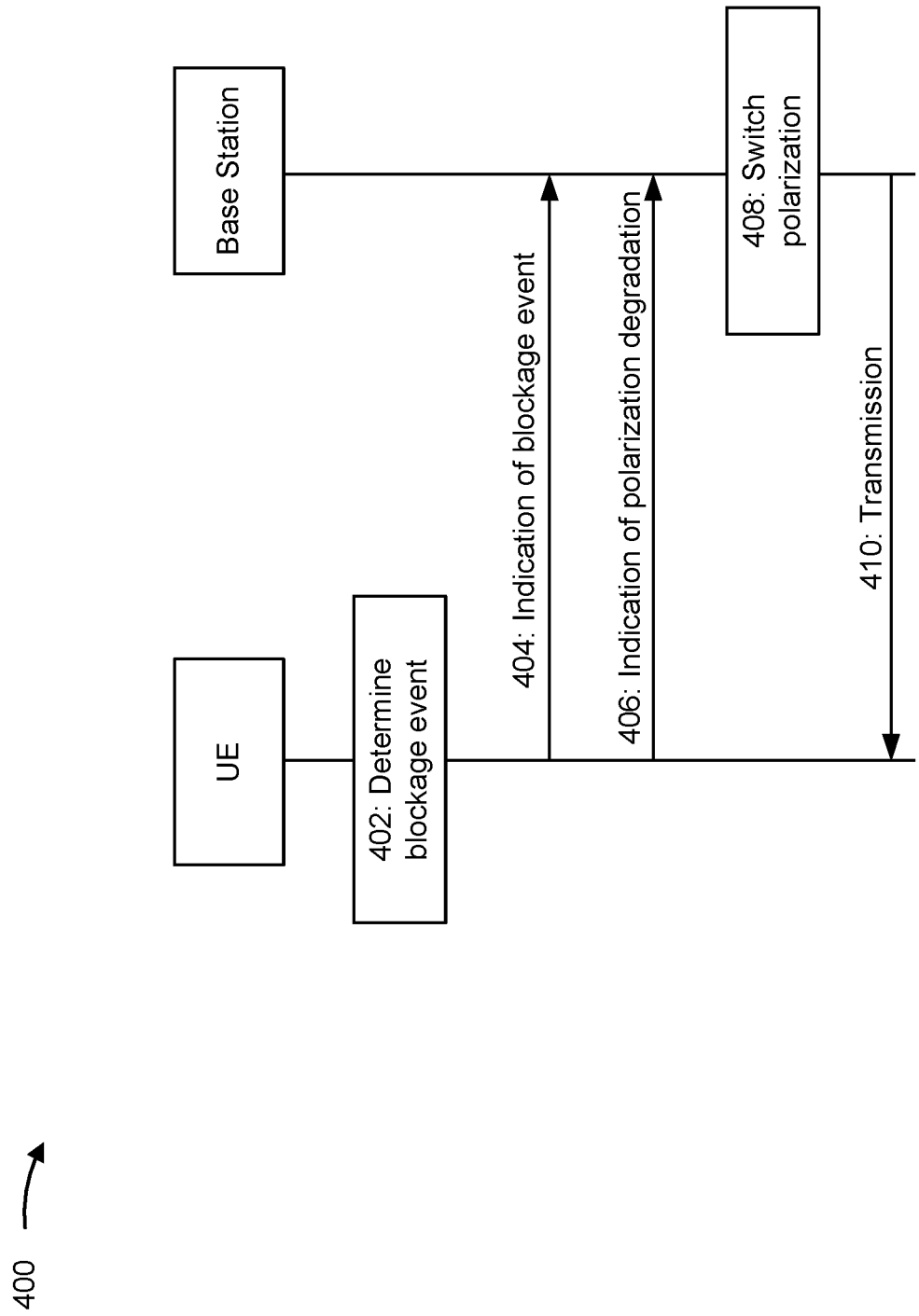
FIG. 4 is a diagram illustrating an example associated with indicating blockage events as a cause for changes in rank information or channel quality information, in accordance with the present disclosure.

FIG. 4 is a diagram illustrating an example 400 associated with indicating blockage events as a cause for changes in rank information or channel quality information, in accordance with the present disclosure. As shown in FIG. 4, example 400 includes communication between a UE (e.g., UE 120) and a base station (e.g., base station 110). In some aspects, the UE and the base station may be included in a wireless network, such as wireless network 100.

In some aspects, the UE may be capable of dual polarization beamforming. The dual polarization beamforming may be associated with a first polarization and a second polarization, such as a co-polarization and a cross polarization, or vice versa. The dual polarization beamforming may be associated with two layers. In some aspects, the first polarization and the second polarization may be associated with linear polarizations. For example, the first polarization may be a horizontal polarization and the second polarization may be a vertical polarization, or vice versa. As another example, the first polarization may be a first slant polarization (e.g., 45 degrees) and the second polarization may be a second slant polarization (e.g., −45 degrees). In some aspects, the first polarization and the second polarization may be associated with circular polarizations. For example, the first polarization may be a left hand circular polarization, and the second polarization may be a right hand circular polarization, or vice versa. In some aspects, the first polarization and the second polarization may be associated with elliptical polarizations. For example, the first polarization may be a left hand elliptical polarization, and the second polarization may be a right hand elliptical polarization, or vice versa.

In some aspects, the UE may be a regular capability UE, or the UE may be a reduced capability UE. In some aspects, the UE may be a UE connected to a base station, or a UE connected to another UE (side link). In some aspects, the UE may be a wearable device.

As shown by reference number 402, the UE may determine (e.g., using controller/processor 280, memory 282, and/or determination component 708) a blockage event that occurs at the UE. The blockage event may be associated with a differential signal power between the first polarization and the second polarization. As an example, the blockage event may be a hand blockage event that involves a user's hand at least partially blocking one or more antenna elements of an antenna module of the UE. As another example, the blockage event may be an object blockage event that involves an object (e.g., a book, another electronic device, another human, a car/vehicle, a building, a different body part such as the torso or the face of the user using the UE, etc.) at least partially blocking the one or more antenna elements of the antenna module of the UE.

In some aspects, the UE may determine a first signal power associated with the first polarization and a second signal power associated with the second polarization. The UE may determine the differential signal power between the first polarization and the second polarization based at least in part on a difference between the first signal power associated with the first polarization and the second signal power associated with the second polarization. The UE may determine that the blockage event occurs based at least in part on the differential signal power between the first polarization and the second polarization satisfying a threshold. In other words, when the differential signal power between the first polarization and the second polarization satisfies the threshold, the UE may infer that the blockage event is causing the differential signal power between the first polarization and the second polarization to satisfy the threshold.

In some aspects, the UE may transmit (e.g., using controller/processor 280, transmit processor 264, TX MIMO processor 266, MOD 254, antenna 252, memory 282, and/or transmission component 704), to the base station, an indication of a change in rank information and/or channel quality information. For example, the indication of the change in the rank information may indicate a change from two layers to one layer (e.g., a change from rank-2 to rank-1). As another example, the indication of the change in the channel quality information may indicate that an MCS has changed from a first MCS, such as 16 quadrature amplitude modulation (16 QAM), to a second MCS, such as binary phase shift keying (BPSK) or quadrature phase shift keying (QPSK). The change in the rank information and/or channel quality information may have an effect on a link quality and/or decoding.

As shown by reference number 404, the UE may transmit, to the base station, an indication that indicates the blockage event is a cause for the change in rank information and/or channel quality information. The blockage event may be associated with the differential signal power between the first polarization and the second polarization. In some aspects, the UE may transmit both the indication of the change in rank information and/or channel quality information and the indication of the blockage event being the cause for the change in rank information and/or channel quality information as a single transmission. Alternatively, the UE may transmit the indication of the change in rank information and/or channel quality information and the indication of the blockage event being the cause for the change in rank information and/or channel quality information as separate transmissions. In some aspects, the UE may determine that the blockage event is the cause for the change in rank information and/or channel quality information based at least in part on the differential signal power between the first polarization and the second polarization satisfying the threshold.

In some aspects, the blockage event may lead to polarization-dependent loss of rank or a change in MCS, thereby causing the change to the rank information and/or channel quality information. The cause for the change in rank information and/or channel quality information (e.g., the blockage event) may be fed back from the UE to the base station. The cause indicating the blockage event, which may be associated with hand blockage, may be fed back to the base station because the blockage event may last for several seconds and may need careful link adaptation unlike channel fading ,which may last a few symbols to a few hundred symbols depending on a coherence duration of the channel.

In some aspects, the UE may indicate, to the base station, the cause of the change to the rank information and/or channel quality information as feedback, which may indicate that the cause is associated with the blockage event (e.g., hand blockage) as opposed to channel fading. The indication of the cause of the change to the rank information and/or channel quality information may result in uplink channel payload savings, such as physical uplink control channel (PUCCH) payload savings, until the blockage event has ceased, which may not occur for several seconds after the blockage event is started. The change to the rank information and/or channel quality information may be induced by polarization-dependent loss in RSRP or signal strength, which may be detected for a period of time that satisfies a threshold. In other words, a timescale of a condition associated with the blockage event may satisfy the threshold.

In some aspects, the UE may transmit a two-bit value to indicate the cause of the change to the rank information and/or channel quality information. For example, a first value may indicate that the blockage event is associated with a hand blockage, a second value may indicate that the blockage event is associated with an object blockage (e.g., a book or other object that causes the blockage), and so on. In some aspects, the polarization-dependent loss in RSRP or signal strength may affect whether the blockage event is associated with the hand blockage, the object blockage, and so on. In other words, different blockage events may be associated with different polarization-dependent losses in RSRP or signal strength.

As shown by reference number 406, the UE may transmit, to the base station, an indication that indicates the first polarization or the second polarization has degraded and a level of signal degradation associated with the first polarization or the second polarization. The UE may determine that the first polarization or the second polarization has degraded based at least in part on the first signal power in relation to the second signal power. The UE may transmit, to the base station, the indication that either the first polarization or the second polarization has been degraded, along with the level of signal degradation, which may indicate (in dB) the level of signal degradation between the first polarization and the second polarization.

As an example, the UE may indicate that a horizontal polarization, a vertical polarization, a slant 45 degree polarization, a slant −45 degree polarization, a left hand circular polarization, a right hand circular polarization, a left hand elliptical polarization, or a right hand elliptical polarization has degraded, as well as a level of signal degradation (in dB) associated with the degraded polarization. The UE may determine which polarization has degraded and the level of signal degradation associated with the degraded polarization based at least in part on RSRP measurements and/or signal strength estimates across polarizations (e.g., across layers).

In some aspects, the base station may receive (e.g., using antenna 234, DEMOD 232, MIMO detector 236, receive processor 238, controller/processor 240, memory 242, and/or reception component 802), from the UE, the indication that indicates the blockage event, and the indication that indicates the first polarization or the second polarization has degraded and a level of signal degradation associated with the first polarization or the second polarization.

As shown by reference number 408, the base station may switch (e.g., using controller/processor 280, memory 282, and/or switching component 808) from a first type of polarization to a second type of polarization based at least in part on the indication that indicates the blockage event. The first type of polarization may be associated with the first polarization and the second polarization. The first type of polarization may be a linear polarization, a circular polarization, or an elliptical polarization. The second type of polarization may be a linear polarization, a circular polarization, or an elliptical polarization. In some aspects, the base station may change polarization properties, which may be applied to later transmissions to the UE from the base station, based at least in part on UE feedback of the blockage event (e.g., hand blockage) driven polarization-specific losses.

As an example, the base station may switch from a linear polarization to a circular polarization based at least in part on the indication that indicates the blockage event. As another example, the base station may switch from a linear polarization to an elliptical/a circular polarization based at least in part on the indication that indicates the blockage event. As yet another example, the base station may switch from a circular polarization to a linear polarization based at least in part on the indication that indicates the blockage event. As yet another example, the base station may switch from an elliptical polarization to a linear polarization based at least in part on the indication that indicates the blockage event.

As shown by reference number 410, the base station may perform (e.g., using controller/processor 240, transmit processor 220, TX MIMO processor 230, MOD 232, antenna 234, memory 242, and/or transmission component 804) a transmission, to the UE, based at least in part on the indication that indicates the blockage event as the cause for the change in one or more of the rank information or the channel quality information. The transmission may be associated with the second type of polarization. In other words, the base station may perform the transmission after switching from the first type of polarization to the second type of polarization.

In some aspects, the UE may receive (using antenna 252, DEMOD 254, MIMO detector 256, receive processor 258, controller/processor 280, memory 282, and/or reception component 702) the transmission from the base station. The UE may receive the transmission with the second type of polarization. In some aspects, the UE may perform transmissions to the base station using the first type of polarization (e.g., linear polarization), and based at least in part on the blockage event, the UE may receive transmissions from the base station with the second type of polarization (e.g., circular polarization or elliptical polarization).

In some aspects, without the base station switching to a different type of polarization, based at least in part on the blockage event, the UE may perform single layer transmissions to the base station and receive single layer transmissions from the base station. When the base station switches to the different type of polarization, based at least in part on the blockage event, the UE may perform single layer transmissions to the base station but receive two layer transmissions from the base station. The UE may receive the two layer transmissions from the base station based at least in part on the base station switching to the different type of polarization. The single layer transmissions from the UE and the two layer transmissions from the base station may allow the base station to derive diversity performance benefits.

In some aspects, UE feedback regarding which polarization has degraded may allow the base station to adapt transmissions from the base station to the UE to an appropriate polarization. In other words, the base station may switch polarizations based at least in part on the UE feedback. The base station may change properties of polarization-based transmissions based at least in part on the UE feedback, which may be used for diversity reception at the base station. For example, based at least in part on UE feedback indicating the change to the rank information and/or channel quality information, the base station may change various electric field properties to switch from horizontal/vertical linear polarization to left/right circular/elliptical polarization, or vice versa, to minimize loss at the base station. The base station may change the various electric field properties to switch between polarizations without circuit level changes. The base station may maintain an appropriate phase difference between polarization ports (e.g., horizontal and vertical polarization ports) depending on a type of polarization used at the base station.

As an example, the base station may switch from a linear polarization to a circular/elliptical polarization to provide robustness across layers at the cost of peak gains on each layer. When a horizontal polarization has degraded at the UE, and with horizontal and vertical polarizations at the base station, only one layer associated with a vertical polarization may be received at the base station. On the other hand, when circular/elliptical polarization is used at the base station, both layers may be received at the UE, but may be degraded by 3 dB at the peak.

In some examples, when an incident wave polarization (e.g., a polarization associated with the base station) is a vertical polarization and a receive antenna polarization is a vertical polarization, a typical attenuation due to a polarization mismatch is 0 dB. When an incident wave polarization is a horizontal polarization and a receive antenna polarization is a horizontal polarization, a typical attenuation due to a polarization mismatch is 0 dB. When an incident wave polarization is a horizontal polarization or a vertical polarization, and a receive antenna polarization is a right hand circular polarization or a left hand circular polarization, a typical attenuation due to a polarization mismatch is 3 dB. Thus, when a right hand circular polarization or a left hand circular polarization has degraded at the UE, when horizontal and vertical polarizations are used at the base station, two layers may be received at the UE, but may be degraded by 3 dB.

In some examples, when an incident wave polarization is a right hand circular polarization and a receive antenna polarization is a right hand circular polarization, a typical attenuation due to a polarization mismatch is 0 dB. When an incident wave polarization is a left hand circular polarization and a receive antenna polarization is a left hand circular polarization, a typical attenuation due to a polarization mismatch is 0 dB. When an incident wave polarization is a right hand circular polarization or a right left circular polarization, and a receive antenna polarization is a vertical polarization or a horizontal polarization, a typical attenuation due to a polarization mismatch is 3 dB. Thus, when a horizontal polarization or a vertical polarization has degraded at the UE, when right hand and left hand circular polarizations are used at the base station, two layers may be received at the UE, but may be degraded by 3 dB.

In some aspects, the UE may stop a two-port uplink transmission and fall back to a single-port uplink transmission for an antenna module associated with the blockage event. The two-port uplink transmission and the single-port uplink transmission may be sounding reference signal (SRS) transmissions. For example, the UE may stop transmitting a two-port SRS and fall back to a single-port SRS for the antenna module associated with the blockage event based at least in part on a determination of polarization degradation. In some aspects, the UE may transmit, to the base station, request to change from a two-port uplink transmission to a single-port uplink transmission based at least in part on the blockage event. For example, the UE may request that the base station change from the two-port SRS to the single-port SRS based at least in part on a blockage event reporting.

As indicated above, FIG. 4 is provided as an example. Other examples may differ from what is described with regard to FIG. 4.

Figure 5:
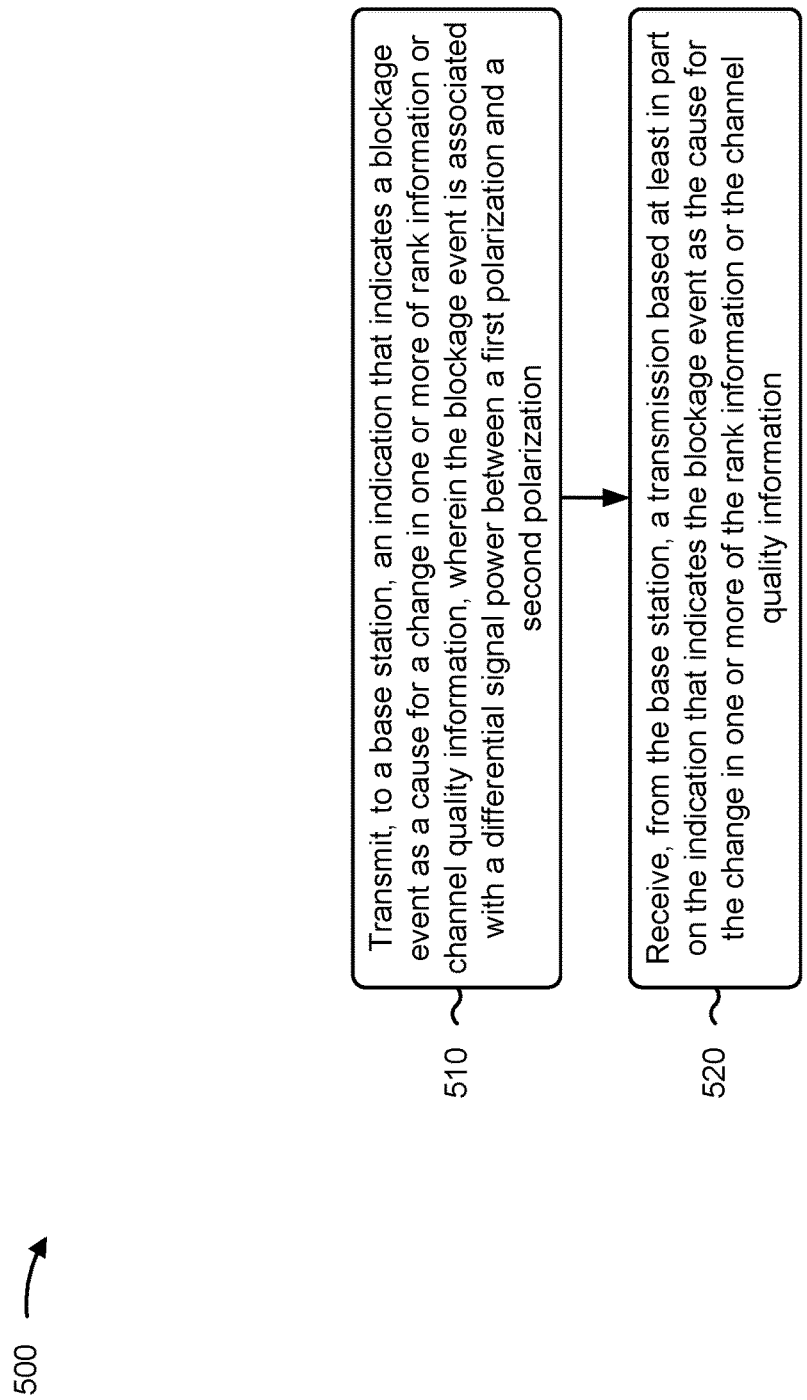
FIGS. 5-6 are diagrams illustrating example processes associated with indicating blockage events as a cause for changes in rank information or channel quality information, in accordance with the present disclosure.

FIG. 5 is a diagram illustrating an example process 500 performed, for example, by a UE, in accordance with the present disclosure. Example process 500 is an example where the UE (e.g., UE 120) performs operations associated with indicating blockage events as a cause for changes in rank information or channel quality information.

As shown in FIG. 5, in some aspects, process 500 may include transmitting, to a base station, an indication that indicates a blockage event as a cause for a change in one or more of rank information or channel quality information, wherein the blockage event is associated with a differential signal power between a first polarization and a second polarization (block 510). For example, the UE (e.g., using communication manager 140 and/or transmission component 704, depicted in FIG. 7) may transmit, to a base station, an indication that indicates a blockage event as a cause for a change in one or more of rank information or channel quality information, wherein the blockage event is associated with a differential signal power between a first polarization and a second polarization, as described above in connection with reference number 404 of FIG. 4.

As further shown in FIG. 5, in some aspects, process 500 may include receiving, from the base station, a transmission based at least in part on the indication that indicates the blockage event as the cause for the change in one or more of the rank information or the channel quality information (block 520). For example, the UE (e.g., using communication manager 140 and/or reception component 702, depicted in FIG. 7) may receive, from the base station, a transmission based at least in part on the indication that indicates the blockage event as the cause for the change in one or more of the rank information or the channel quality information, as described above in connection with reference number 410 of FIG. 4.

Process 500 may include additional aspects, such as any single aspect or any combination of aspects described below and/or in connection with one or more other processes described elsewhere herein.

In a first aspect, process 500 includes determining the differential signal power between the first polarization and the second polarization based at least in part on a difference between a first signal power associated with the first polarization and a second signal power associated with the second polarization, wherein the first polarization and the second polarization are associated with dual polarization beamforming, and determining that the blockage event is the cause for the change in one or more of the rank information or the channel quality information based at least in part on the differential signal power between the first polarization and the second polarization satisfying a threshold.

In a second aspect, alone or in combination with the first aspect, process 500 includes determining that the first polarization or the second polarization has degraded based at least in part on the first signal power in relation to the second signal power, and transmitting, to the base station, another indication that indicates that the first polarization or the second polarization has degraded and a level of signal degradation associated with the first polarization or the second polarization. In a third aspect, alone or in combination with one or more of the first and second aspects, process 500 includes stopping a two-port uplink transmission and falling back to a single-port uplink transmission for an antenna module associated with the blockage event.

In a fourth aspect, alone or in combination with one or more of the first through third aspects, process 500 includes transmitting, to the base station, a request to change from a two-port uplink transmission to a single-port uplink transmission based at least in part on the blockage event. In a fifth aspect, alone or in combination with one or more of the first through fourth aspects, the first polarization and the second polarization are associated with a first type of polarization, wherein the transmission received from the base station is associated with a second type of polarization, and the first type of polarization and the second type of polarization are each one of a linear polarization, a circular polarization, or an elliptical polarization.

In a sixth aspect, alone or in combination with one or more of the first through fifth aspects, the first polarization and the second polarization are associated with linear polarizations, and wherein the first polarization is a horizontal polarization or a slant 45 degree polarization and the second polarization is a vertical polarization or a slant −45 degree polarization, or the first polarization is a vertical polarization or a slant −45 degree polarization and the second polarization is a horizontal polarization or a slant 45 degree polarization, the first polarization and the second polarization are associated with circular polarizations, and wherein the first polarization is a left hand circular polarization and the second polarization is a right hand circular polarization, or the first polarization is a right hand circular polarization and the second polarization is a left hand circular polarization, or the first polarization and the second polarization are associated with elliptical polarizations, and wherein the first polarization is a left hand elliptical polarization and the second polarization is a right hand elliptical polarization, or the first polarization is a right hand elliptical polarization and the second polarization is a left hand elliptical polarization.

In a seventh aspect, alone or in combination with one or more of the first through sixth aspects, the blockage event is a hand blockage event that involves a user hand at least partially blocking one or more antenna elements of an antenna module of the UE. In an eighth aspect, alone or in combination with one or more of the first through seventh aspects, the blockage event is an object blockage event that involves an object at least partially blocking one or more antenna elements of an antenna module of the UE.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
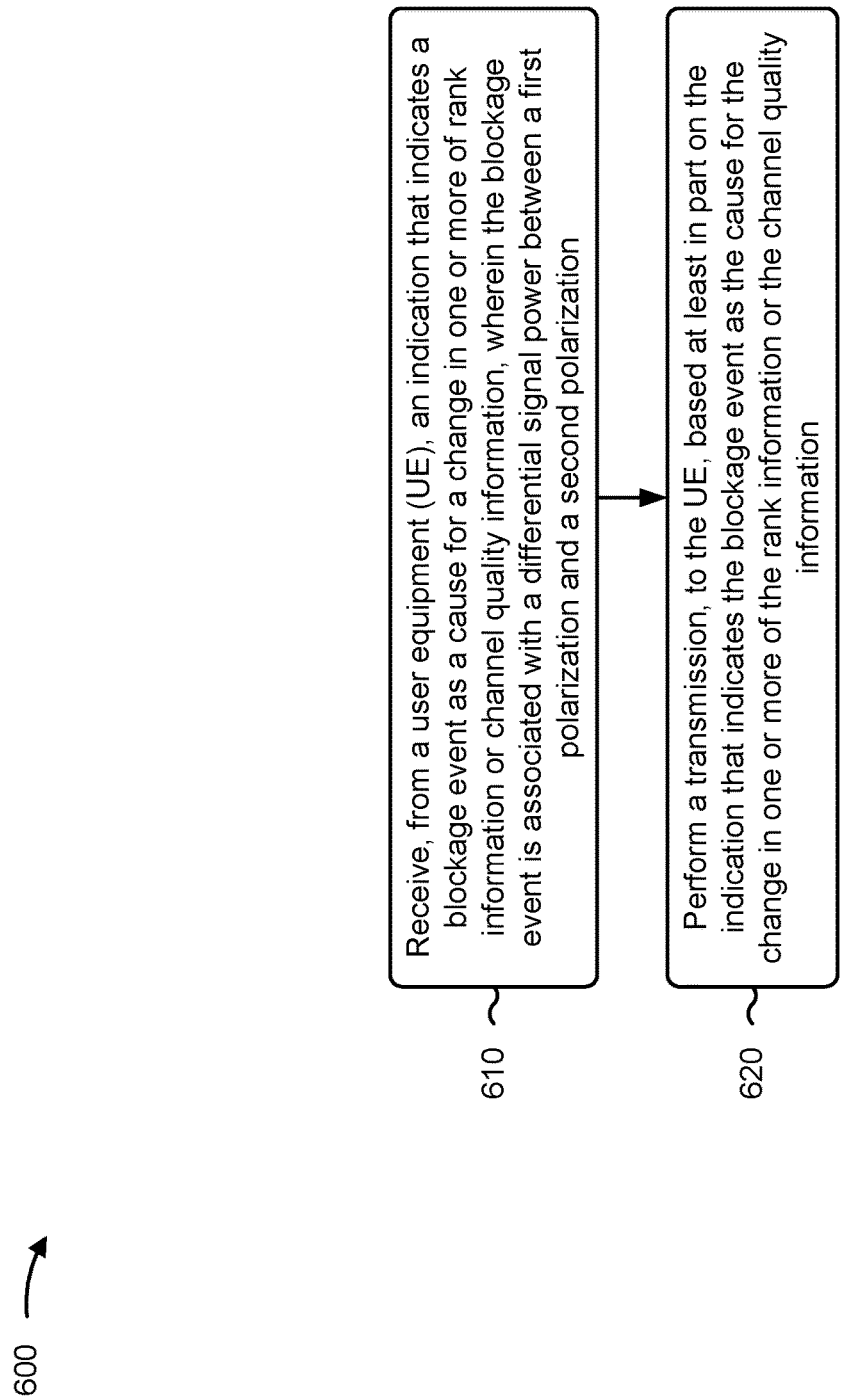

FIG. 6 is a diagram illustrating an example process 600 performed, for example, by a base station, in accordance with the present disclosure. Example process 600 is an example where the base station (e.g., base station 110) performs operations associated with indicating blockage events as a cause for changes in rank information or channel quality information.

As shown in FIG. 6, in some aspects, process 600 may include receiving, from a UE, an indication that indicates a blockage event as a cause for a change in one or more of rank information or channel quality information, wherein the blockage event is associated with a differential signal power between a first polarization and a second polarization (block 610). For example, the base station (e.g., using communication manager 150 and/or reception component 802, depicted in FIG. 8) may receive, from a UE, an indication that indicates a blockage event as a cause for a change in one or more of rank information or channel quality information, wherein the blockage event is associated with a differential signal power between a first polarization and a second polarization, as described above in connection with reference number 404 of FIG. 4.

As further shown in FIG. 6, in some aspects, process 600 may include performing a transmission, to the UE, based at least in part on the indication that indicates the blockage event as the cause for the change in one or more of the rank information or the channel quality information (block 620). For example, the base station (e.g., using communication manager 150 and/or transmission component 804, depicted in FIG. 8) may perform a transmission, to the UE, based at least in part on the indication that indicates the blockage event as the cause for the change in one or more of the rank information or the channel quality information, as described above in connection with reference number 410 of FIG. 4.

Process 600 may include additional aspects, such as any single aspect or any combination of aspects described below and/or in connection with one or more other processes described elsewhere herein.

In a first aspect, the first polarization and the second polarization are associated with a first type of polarization, and wherein the transmission is associated with a second type of polarization. In a second aspect, alone or in combination with the first aspect, process 600 includes switching from the first type of polarization to the second type of polarization based at least in part on the indication that indicates the blockage event, wherein the first type of polarization and the second type of polarization are each one of a linear polarization, a circular polarization, or an elliptical polarization.

In a third aspect, alone or in combination with one or more of the first and second aspects, process 600 includes receiving, from the UE, another indication that indicates that the first polarization or the second polarization has degraded and a level of signal degradation associated with the first polarization or the second polarization. In a fourth aspect, alone or in combination with one or more of the first through third aspects, process 600 includes receiving, from the UE, a request to change from a two-port uplink transmission to a single-port uplink transmission based at least in part on the blockage event. In a fifth aspect, alone or in combination with one or more of the first through fourth aspects, the blockage event is a hand blockage event that involves a user hand at least partially blocking one or more antenna elements of an antenna module of the UE, or the blockage event is an object blockage event that involves an object at least partially blocking the one or more antenna elements of the antenna module of the UE.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
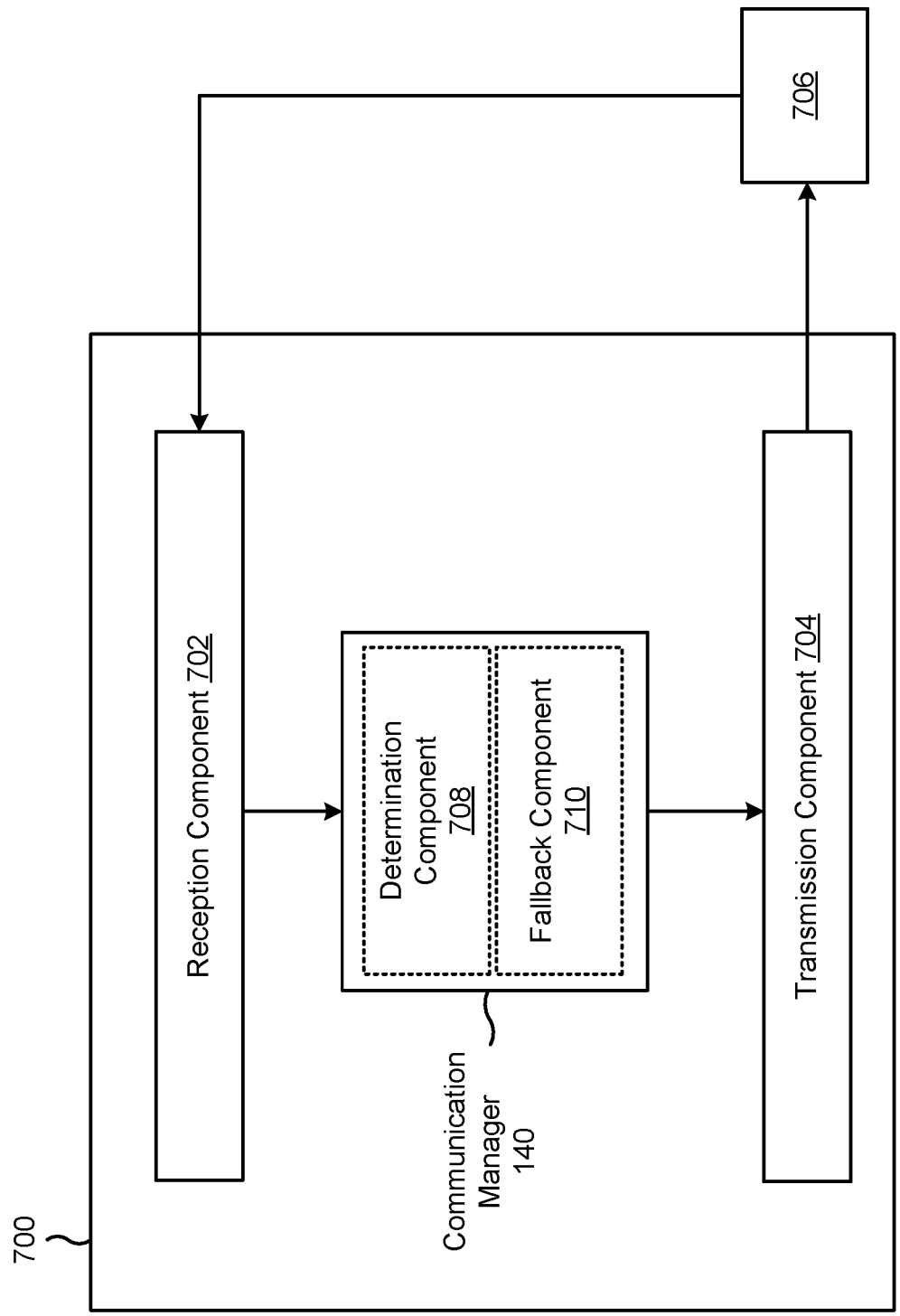
FIGS. 7-8 are block diagrams of example apparatuses for wireless communication, in accordance with the present disclosure.

FIG. 7 is a block diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 140. The communication manager 140 may include one or more of a determination component 708, or a fallback component 710, among other examples.

In some aspects, the apparatus 700 may be configured to perform one or more operations described herein in connection with FIG. 4. Additionally, or alternatively, the apparatus 700 may be configured to perform one or more processes described herein, such as process 500 of FIG. 5, or a combination thereof In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The transmission component 704 may transmit, to a base station, an indication that indicates a blockage event as a cause for a change in one or more of rank information or channel quality information, wherein the blockage event is associated with a differential signal power between a first polarization and a second polarization. The reception component 702 may receive, from the base station, a transmission based at least in part on the indication that indicates the blockage event as the cause for the change in one or more of the rank information or the channel quality information.

The determination component 708 may determine the differential signal power between the first polarization and the second polarization based at least in part on a difference between a first signal power associated with the first polarization and a second signal power associated with the second polarization, wherein the first polarization and the second polarization are associated with dual polarization beamforming. The determination component 708 may determine that the blockage event is the cause for the change in one or more of the rank information or the channel quality information based at least in part on the differential signal power between the first polarization and the second polarization satisfying a threshold. The determination component 708 may determine that the first polarization or the second polarization has degraded based at least in part on the first signal power in relation to the second signal power.

The transmission component 704 may transmit, to the base station, another indication that indicates that the first polarization or the second polarization has degraded and a level of signal degradation associated with the first polarization or the second polarization. The fallback component 710 may stop a two-port uplink transmission and fall back to a single-port uplink transmission for an antenna module associated with the blockage event. The transmission component 704 may transmit, to the base station, a request to change from a two-port uplink transmission to a single-port uplink transmission based at least in part on the blockage event.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
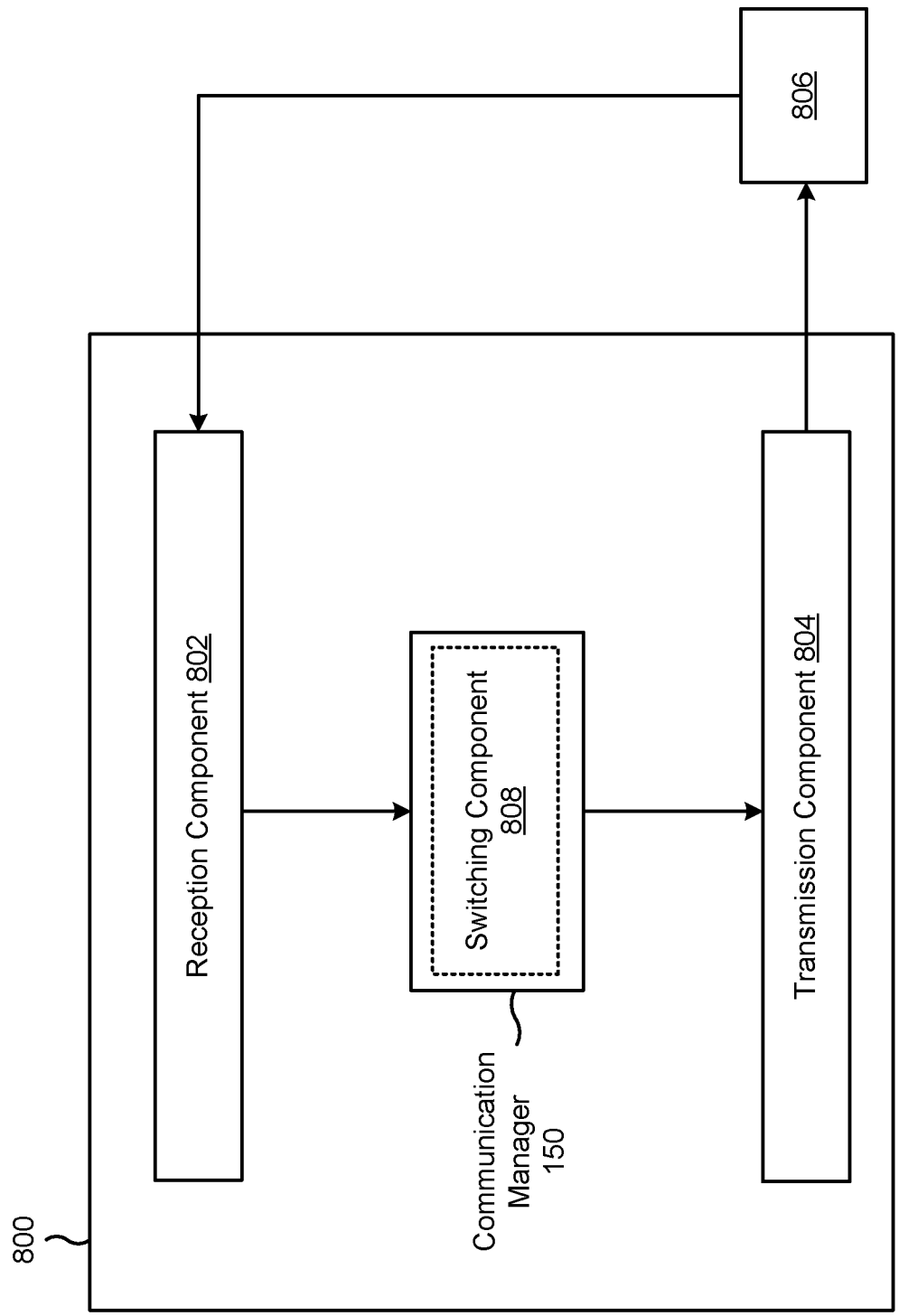

FIG. 8 is a block diagram of an example apparatus 800 for wireless communication. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 150. The communication manager 150 may include a switching component 808, among other examples.

In some aspects, the apparatus 800 may be configured to perform one or more operations described herein in connection with FIG. 4. Additionally, or alternatively, the apparatus 800 may be configured to perform one or more processes described herein, such as process 600 of FIG. 6. In some aspects, the apparatus 800 and/or one or more components shown in FIG. 8 may include one or more components of the base station described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the base station described in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the base station described in connection with FIG. 2. In some aspects, the transmission component 804 may be co-located with the reception component 802 in a transceiver.

The reception component 802 may receive, from a UE, an indication that indicates a blockage event as a cause for a change in one or more of rank information or channel quality information, wherein the blockage event is associated with a differential signal power between a first polarization and a second polarization. The transmission component 804 may perform a transmission, to the UE, based at least in part on the indication that indicates the blockage event as the cause for the change in one or more of the rank information or the channel quality information.

The switching component 808 may switch from the first type of polarization to the second type of polarization based at least in part on the indication that indicates the blockage event, wherein the first type of polarization and the second type of polarization are each one of a linear polarization, a circular polarization, or an elliptical polarization. The reception component 802 may receive, from the UE, another indication that indicates that the first polarization or the second polarization has degraded and a level of signal degradation associated with the first polarization or the second polarization. The reception component 802 may receive, from the UE, a request to change from a two-port uplink transmission to a single-port uplink transmission based at least in part on the blockage event.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: transmitting, to a base station, an indication that indicates a blockage event as a cause for a change in one or more of rank information or channel quality information, wherein the blockage event is associated with a differential signal power between a first polarization and a second polarization; and receiving, from the base station, a transmission based at least in part on the indication that indicates the blockage event as the cause for the change in one or more of the rank information or the channel quality information.

Aspect 2: The method of Aspect 1, further comprising: determining the differential signal power between the first polarization and the second polarization based at least in part on a difference between a first signal power associated with the first polarization and a second signal power associated with the second polarization, wherein the first polarization and the second polarization are associated with dual polarization beamforming; and determining that the blockage event is the cause for the change in one or more of the rank information or the channel quality information based at least in part on the differential signal power between the first polarization and the second polarization satisfying a threshold.

Aspect 3: The method of Aspect 2, further comprising: determining that the first polarization or the second polarization has degraded based at least in part on the first signal power in relation to the second signal power; and transmitting, to the base station, another indication that indicates that the first polarization or the second polarization has degraded and a level of signal degradation associated with the first polarization or the second polarization.

Aspect 4: The method of any of Aspects 1 through 3, further comprising: stopping a two-port uplink transmission and falling back to a single-port uplink transmission for an antenna module associated with the blockage event.

Aspect 5: The method of any of Aspects 1 through 4, further comprising: transmitting, to the base station, a request to change from a two-port uplink transmission to a single-port uplink transmission based at least in part on the blockage event.

Aspect 6: The method of any of Aspects 1 through 5, wherein the first polarization and the second polarization are associated with a first type of polarization, wherein the transmission received from the base station is associated with a second type of polarization, and wherein the first type of polarization and the second type of polarization are each one of a linear polarization, a circular polarization, or an elliptical polarization.

Aspect 7: The method of any of Aspects 1 through 6, wherein: the first polarization and the second polarization are associated with linear polarizations, and wherein the first polarization is a horizontal polarization or a slant 45 degree polarization and the second polarization is a vertical polarization or a slant −45 degree polarization, or the first polarization is a vertical polarization or a slant −45 degree polarization and the second polarization is a horizontal polarization or a slant 45 degree polarization; the first polarization and the second polarization are associated with circular polarizations, and wherein the first polarization is a left hand circular polarization and the second polarization is a right hand circular polarization, or the first polarization is a right hand circular polarization and the second polarization is a left hand circular polarization; or the first polarization and the second polarization are associated with elliptical polarizations, and wherein the first polarization is a left hand elliptical polarization and the second polarization is a right hand elliptical polarization, or the first polarization is a right hand elliptical polarization and the second polarization is a left hand elliptical polarization.

Aspect 8: The method of any of Aspects 1 through 7, wherein the blockage event is a hand blockage event that involves a user hand at least partially blocking one or more antenna elements of an antenna module of the UE.

Aspect 9: The method of any of Aspects 1 through 8, wherein the blockage event is an object blockage event that involves an object at least partially blocking one or more antenna elements of an antenna module of the UE.

Aspect 10: A method of wireless communication performed by a base station, comprising: receiving, from a user equipment (UE), an indication that indicates a blockage event as a cause for a change in one or more of rank information or channel quality information, wherein the blockage event is associated with a differential signal power between a first polarization and a second polarization; and performing a transmission, to the UE, based at least in part on the indication that indicates the blockage event as the cause for the change in one or more of the rank information or the channel quality information.

Aspect 11: The method of Aspect 10, wherein the first polarization and the second polarization are associated with a first type of polarization, and wherein the transmission is associated with a second type of polarization.

Aspect 12: The method of Aspect 11, further comprising: switching from the first type of polarization to the second type of polarization based at least in part on the indication that indicates the blockage event, wherein the first type of polarization and the second type of polarization are each one of a linear polarization, a circular polarization, or an elliptical polarization.

Aspect 13: The method of any of Aspects 10 through 12, further comprising: receiving, from the UE, another indication that indicates that the first polarization or the second polarization has degraded and a level of signal degradation associated with the first polarization or the second polarization.

Aspect 14: The method of any of Aspects 10 through 13, further comprising: receiving, from the UE, a request to change from a two-port uplink transmission to a single-port uplink transmission based at least in part on the blockage event.

Aspect 15: The method of any of Aspects 10 through 14, wherein: the blockage event is a hand blockage event that involves a user hand at least partially blocking one or more antenna elements of an antenna module of the UE; or the blockage event is an object blockage event that involves an object at least partially blocking the one or more antenna elements of the antenna module of the UE.

Aspect 16: An apparatus for wireless communication at a device, comprising a processor; memory coupled with the processor; and instructions stored in the memory and executable by the processor to cause the apparatus to perform the method of one or more of Aspects 1-9.

Aspect 17: A device for wireless communication, comprising a memory and one or more processors coupled to the memory, the one or more processors configured to perform the method of one or more of Aspects 1-9.

Aspect 18: An apparatus for wireless communication, comprising at least one means for performing the method of one or more of Aspects 1-9.

Aspect 19: A non-transitory computer-readable medium storing code for wireless communication, the code comprising instructions executable by a processor to perform the method of one or more of Aspects 1-9.

Aspect 20: A non-transitory computer-readable medium storing a set of instructions for wireless communication, the set of instructions comprising one or more instructions that, when executed by one or more processors of a device, cause the device to perform the method of one or more of Aspects 1-9.

Aspect 21: An apparatus for wireless communication at a device, comprising a processor; memory coupled with the processor; and instructions stored in the memory and executable by the processor to cause the apparatus to perform the method of one or more of Aspects 10-15.

Aspect 22: A device for wireless communication, comprising a memory and one or more processors coupled to the memory, the one or more processors configured to perform the method of one or more of Aspects 10-15.

Aspect 23: An apparatus for wireless communication, comprising at least one means for performing the method of one or more of Aspects 10-15.

Aspect 24: A non-transitory computer-readable medium storing code for wireless communication, the code comprising instructions executable by a processor to perform the method of one or more of Aspects 10-15.

Aspect 25: A non-transitory computer-readable medium storing a set of instructions for wireless communication, the set of instructions comprising one or more instructions that, when executed by one or more processors of a device, cause the device to perform the method of one or more of Aspects 10-15.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one" of a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   a memory; and
   one or more processors, coupled to the memory, configured to:
      transmit, to a base station, an indication that indicates a blockage event as a cause for a change in one or more of rank information or channel quality information, wherein the blockage event is associated with a differential signal power, between a first polarization and a second polarization, satisfying a threshold; and
      receive, from the base station, a transmission based at least in part on the indication that indicates the blockage event as the cause for the change in one or more of the rank information or the channel quality information.

2. The apparatus of claim 1, wherein the one or more processors are further configured to:
   determine the differential signal power between the first polarization and the second polarization based at least in part on a difference between a first signal power associated with the first polarization and a second signal power associated with the second polarization, wherein the first polarization and the second polarization are associated with dual polarization beamforming; and
   determine that the blockage event is the cause for the change in one or more of the rank information or the channel quality information based at least in part on the differential signal power between the first polarization and the second polarization satisfying the threshold.

3. The apparatus of claim 2, wherein the one or more processors are further configured to:
   determine that the first polarization or the second polarization has degraded based at least in part on the first signal power in relation to the second signal power; and
   transmit, to the base station, another indication that indicates that the first polarization or the second polarization has degraded and a level of signal degradation associated with the first polarization or the second polarization.

4. The apparatus of claim 1, wherein the one or more processors are further configured to:
   stop a two-port uplink transmission and fall back to a single-port uplink transmission for an antenna module associated with the blockage event.

5. The apparatus of claim 1, wherein the one or more processors are further configured to:
   transmit, to the base station, a request to change from a two-port uplink transmission to a single-port uplink transmission based at least in part on the blockage event.

6. The apparatus of claim 1, wherein the first polarization and the second polarization are associated with a first type of polarization, wherein the transmission received from the base station is associated with a second type of polarization, and wherein the first type of polarization and the second type of polarization are each one of a linear polarization, a circular polarization, or an elliptical polarization.

7. The apparatus of claim 1, wherein:
   the first polarization and the second polarization are associated with linear polarizations, and wherein the first polarization is a horizontal polarization or a slant 45 degree polarization and the second polarization is a vertical polarization or a slant −45 polarization, or the first polarization is a vertical polarization or a slant −45 polarization and the second polarization is a horizontal polarization or a slant 45 degree polarization;
   the first polarization and the second polarization are associated with circular polarizations, and wherein the first polarization is a left hand circular polarization and the second polarization is a right hand circular polarization, or the first polarization is a right hand circular polarization and the second polarization is a left hand circular polarization; or
   the first polarization and the second polarization are associated with elliptical polarizations, and wherein the first polarization is a left hand elliptical polarization and the second polarization is a right hand elliptical polarization, or the first polarization is a right hand elliptical polarization and the second polarization is a left hand elliptical polarization.

8. The apparatus of claim 1, wherein the blockage event is a hand blockage event that involves a user hand at least partially blocking one or more antenna elements of an antenna module of the UE.

9. The apparatus of claim 1, wherein the blockage event is an object blockage event that involves an object at least partially blocking one or more antenna elements of an antenna module of the UE.

10. An apparatus for wireless communication at a base station, comprising:
a memory; and
one or more processors, coupled to the memory, configured to:
receive, from a user equipment (UE), an indication that indicates a blockage event as a cause for a change in one or more of rank information or channel quality information, wherein the blockage event is associated with a differential signal power, between a first polarization and a second polarization, satisfying a threshold; and
perform a transmission, to the UE, based at least in part on the indication that indicates the blockage event as the cause for the change in one or more of the rank information or the channel quality information.

11. The apparatus of claim 10, wherein the first polarization and the second polarization are associated with a first type of polarization, and wherein the transmission is associated with a second type of polarization.

12. The apparatus of claim 11, wherein the one or more processors are further configured to:
switch from the first type of polarization to the second type of polarization based at least in part on the indication that indicates the blockage event, wherein the first type of polarization and the second type of polarization are each one of a linear polarization, a circular polarization, or an elliptical polarization.

13. The apparatus of claim 10, wherein the one or more processors are further configured to:
receive, from the UE, another indication that indicates that the first polarization or the second polarization has degraded and a level of signal degradation associated with the first polarization or the second polarization.

14. The apparatus of claim 10, wherein the one or more processors are further configured to:
receive, from the UE, a request to change from a two-port uplink transmission to a single-port uplink transmission based at least in part on the blockage event.

15. The apparatus of claim 10, wherein:
the blockage event is a hand blockage event that involves a user hand at least partially blocking one or more antenna elements of an antenna module of the UE; or
the blockage event is an object blockage event that involves an object at least partially blocking the one or more antenna elements of the antenna module of the UE.

16. A method of wireless communication performed by a user equipment (UE), comprising:
transmitting, to a base station, an indication that indicates a blockage event as a cause for a change in one or more of rank information or channel quality information, wherein the blockage event is associated with a differential signal power, between a first polarization and a second polarization, satisfying a threshold; and
receiving, from the base station, a transmission based at least in part on the indication that indicates the blockage event as the cause for the change in one or more of the rank information or the channel quality information.

17. The method of claim 16, further comprising:
determining the differential signal power between the first polarization and the second polarization based at least in part on a difference between a first signal power associated with the first polarization and a second signal power associated with the second polarization, wherein the first polarization and the second polarization are associated with dual polarization beamforming; and
determining that the blockage event is the cause for the change in one or more of the rank information or the channel quality information based at least in part on the differential signal power between the first polarization and the second polarization satisfying the threshold.

18. The method of claim 17, further comprising:
determining that the first polarization or the second polarization has degraded based at least in part on the first signal power in relation to the second signal power; and
transmitting, to the base station, another indication that indicates that the first polarization or the second polarization has degraded and a level of signal degradation associated with the first polarization or the second polarization.

19. The method of claim 16, further comprising:
stopping a two-port uplink transmission and falling back to a single-port uplink transmission for an antenna module associated with the blockage event.

20. The method of claim 16, further comprising:
transmitting, to the base station, a request to change from a two-port uplink transmission to a single-port uplink transmission based at least in part on the blockage event.

21. The method of claim 16, wherein the first polarization and the second polarization are associated with a first type of polarization, wherein the transmission received from the base station is associated with a second type of polarization, and wherein the first type of polarization and the second type of polarization are each one of a linear polarization, a circular polarization, or an elliptical polarization.

22. The method of claim 16, wherein:
the first polarization and the second polarization are associated with linear polarizations, and wherein the first polarization is a horizontal polarization or a slant 45 degree polarization and the second polarization is a vertical polarization or a slant −45 degree polarization, or the first polarization is a vertical polarization or a slant −45 degree polarization and the second polarization is a horizontal polarization or a slant 45 degree polarization;
the first polarization and the second polarization are associated with circular polarizations, and wherein the first polarization is a left hand circular polarization and the second polarization is a right hand circular polarization, or the first polarization is a right hand circular polarization and the second polarization is a left hand circular polarization; or
the first polarization and the second polarization are associated with elliptical polarizations, and wherein the first polarization is a left hand elliptical polarization and the second polarization is a right hand elliptical polarization, or the first polarization is a right hand elliptical polarization and the second polarization is a left hand elliptical polarization.

23. The method of claim 16, wherein the blockage event is a hand blockage event that involves a user hand at least partially blocking one or more antenna elements of an antenna module of the UE.

24. The method of claim 16, wherein the blockage event is an object blockage event that involves an object at least partially blocking one or more antenna elements of an antenna module of the UE.

25. A method of wireless communication performed by a base station, comprising:
   receiving, from a user equipment (UE), an indication that indicates a blockage event as a cause for a change in one or more of rank information or channel quality information, wherein the blockage event is associated with a differential signal power, between a first polarization and a second polarization, satisfying a threshold; and
   performing a transmission, to the UE, based at least in part on the indication that indicates the blockage event as the cause for the change in one or more of the rank information or the channel quality information.

26. The method of claim 25, wherein the first polarization and the second polarization are associated with a first type of polarization, and wherein the transmission is associated with a second type of polarization.

27. The method of claim 26, further comprising:
switching from the first type of polarization to the second type of polarization based at least in part on the indication that indicates the blockage event, wherein the first type of polarization and the second type of polarization are each one of a linear polarization, a circular polarization, or an elliptical polarization.

28. The method of claim 25, further comprising:
receiving, from the UE, another indication that indicates that the first polarization or the second polarization has degraded and a level of signal degradation associated with the first polarization or the second polarization.

29. The method of claim 25, further comprising:
receiving, from the UE, a request to change from a two-port uplink transmission to a single-port uplink transmission based at least in part on the blockage event.

30. The method of claim 25, wherein:
the blockage event is a hand blockage event that involves a user hand at least partially blocking one or more antenna elements of an antenna module of the UE; or the blockage event is an object blockage event that involves an object at least partially blocking the one or more antenna elements of the antenna module of the UE.

* * * * *